(12) United States Patent
Bruno et al.

(10) Patent No.: US 8,150,790 B2
(45) Date of Patent: Apr. 3, 2012

(54) LIGHTWEIGHT PHYSICAL DESIGN ALERTER

(75) Inventors: Nicolas Bruno, Redmond, WA (US); Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1266 days.

(21) Appl. No.: 11/669,782

(22) Filed: Jan. 31, 2007

(65) Prior Publication Data

US 2008/0183644 A1 Jul. 31, 2008

(51) Int. Cl.
G06N 5/02 (2006.01)
(52) U.S. Cl. .......... 706/47; 707/713; 707/737; 707/803
(58) Field of Classification Search .............. 706/47; 707/1, 100, 713, 737, 803
See application file for complete search history.

(56) References Cited

U.S. PATENT DOCUMENTS

| | | | |
|---|---|---|---|
| 4,956,744 A | 9/1990 | Berghout et al. | |
| 5,133,075 A | 7/1992 | Risch | |
| 5,404,510 A | 4/1995 | Smith et al. | |
| 5,485,610 A | 1/1996 | Gioielli et al. | |
| 5,761,654 A | 6/1998 | Tow | |
| 6,195,653 B1 | 2/2001 | Bleizeffer et al. | |
| 6,938,035 B2 | 8/2005 | Driesch, Jr. et al. | |
| 7,047,231 B2 | 5/2006 | Grasshoff et al. | |
| 7,139,778 B2 | 11/2006 | Chaudhuri et al. | |
| 2004/0003088 A1 | 1/2004 | Ng et al. | |
| 2005/0044535 A1 | 2/2005 | Coppert | |
| 2005/0086195 A1 | 4/2005 | Tan et al. | |
| 2005/0187917 A1 | 8/2005 | Lawande et al. | |
| 2006/0036989 A1 | 2/2006 | Chaudhuri et al. | |
| 2006/0101224 A1 | 5/2006 | Shah et al. | |
| 2006/0136358 A1 | 6/2006 | Sonkin et al. | |
| 2006/0242102 A1 | 10/2006 | Bruno et al. | |

OTHER PUBLICATIONS

"Application of the Branch and Bound Technique to Some Flow-Shop Scheduling Problems", Edward Ignall & Linus Schrage, Operations Research, vol. 13, No. 3, May-Jun. 1965, pp. 400-412.*

"A general branch and bound formulation for understanding and synthesizing and/or tree search procedures", Vipin Kumar and Laveen N. Kanal, Artificial Intelligence, vol. 21, Issues 1-2, Mar. 1983, pp. 179-198.*

"Parallel Branch-And-Bound Formulations for AND/OR Tree Search", V. Kumar & L. Kanal, Department of Computer Sciences, University of Texas at Austin, TR-83-14, Aug. 1983, 34 pages.*

"Query processing in main memory database management systems", Tobin J. Lehman, Michael J. Carey, International Conference on Management of Data, Proceedings of the 1986 ACM SIGMOD international conference on Management of data, May 28-30, 1986, pp. 239-250.*

(Continued)

*Primary Examiner* — Jeffrey A Gaffin
*Assistant Examiner* — Mai T Tran
(74) *Attorney, Agent, or Firm* — Lee & Hayes, PLLC

(57) ABSTRACT

A lightweight physical design alerter can analyze a workload and determine whether a comprehensive tuning session would result in a configuration improvement over the current configuration. The alerter provides a low-overhead procedure that can run during normal operation of a database management system and produce a notification if a current configuration is less than optimal. The alerter can report lower and upper bounds on the improvements that could be obtained if a comprehensive tuning tool is launched. A lower bound can be justified by generating feasible configurations. The disclosed embodiments can be extended to query updates, materialized views, and other physical design features (e.g., partitioning).

20 Claims, 12 Drawing Sheets

OTHER PUBLICATIONS

"A study of index structures for main memory database management systems", Tobin J. Lehman, Michael J. Carey, Proceedings of the Twelfth International, Conference on Very Large Data Bases, Kyoto, Aug. 1986, pp. 294-303.*

"Parallel Branch-and-Bound Formulations for AND/OR Tree Search", V. Kumar, L. N. Kanal, IEEE Transactions on Pattern Analysis and Machine Intelligence, vol. Pami-6, No. 6, Nov. 1984, pp. 768-778.*

S. Agrawal, et al. Database Tuning Advisor for Microsoft SQL Server 2005.:Demo In Proceedings of the 30th International Conference on VLDB, 2004. pp. 930-932.

N. Bruno and S. Chaudhuri. Automatic physical database tuning: A relaxation-based approach. In Proceedings of the ACM International Conference on Management of Data (SIGMOD), 2005. pp. 227-238.

B. Dageville, et al. Automatic SQL Tuning in Oracle 10g. In Proceedings of the 30th International Conference on VLDB, 2004. pp. 1098-1109.

G. Graefe. The Cascades framework for query optimization. Data Engineering Bulletin, 18(3), 1995. pp. 19-28.

P.G. Selinger, et al. Access path selection in a relational database management. System In Proceedings of the ACM International Conference on Management of Data (SIGMOD), 1979. pp. 23-34.

D. Zilio, et al. DB2 design advisor: Integrated automatic physical database design. In Proceedings of the 30th International Conference on VLDB, 2004. pp. 1087-1097.

S. Agrawal, et al. Automatic physical design tuning: workload as a sequence. in Proceeding of the ACM International Conference on Management of Data (SIGMOD), 2006. pp. 683-694.

N. Bruno and S. Chaudhuri. To tune or not to tune? A lightweight Physical Design Alerter. In Proceedings of the 32th International Conference on Very Large Databases (VLDB), 2006. pp. 499-510.

K. Schnaitter, et al. Colt: continuous on-line Database tuning. in Proceedings of the ACM International conference on Management of Data (SIGMOD), 2006. pp. 793-795.

Agrawal, et al., "Automated Selection of Materialized Views and Indexes for SQL Databases". In Proceedings of the International Conference on VLDB. 2000. 10 pages.

Agrawal, et al., "Automatic Physical Design Tuning: Workload as a Sequence", <<http://delivery.acm.org/10.1145/1150000/1142549/p693-agrawal.pdf?key1=1145249&key2=9173974611&coll=GUIDE&dl=GUIDE&CFID=7469137&CFTOKEN=67384087>> Last accessed Nov. 30, 2006. pp. 683-694, Jun. 27-29, 2006.

Agrawal, et al., "Database Tuning Advisor for Microsoft SQL Server 2005: Demo" <<http://delivery.acm.org/10.1145/1070000/1066292/p930-agrawal.pdf?key1=1066292&key2=8301473611&coll=GUIDE&dl=GUIDE&CFID=4730800&CFTOKEN=90243228>> Last accessed Nov. 21, 2006. pp. 930-932, Jun. 14-16, 2005.

Bruno, et al., "Physical Design Refinement: The "Merge-Reduce" Approach". In International Conference on Extending Database Technology (EDBT), 2006. 18 pages.

Chaudhuri, et al., "An Efficient, Cost-Driven Index Selection Tool for Microsoft SQL Server", <<http://www.vldb.org/conf/1997/P146.PDF>> Last accessed Nov. 30, 2006. pp. 146-155, Proceedings of the 23rd VLDB Conference, Athens, Greece 1997.

Chaudhuri, et al., "Index Merging". In Proceedings of the International Conference on Data Engineering (ICDE), 1999. 8 pages.

Microsoft Corporation, "Dynamic Management Views and Functions". Accessible at <<http://msdn2.microsoft.com/en-us/library/ms188754.aspx>> Last accessed Jan. 31, 2007. 2 pages.

Sattler, et al., "QUIET: Continuous Query-driven Index Tuning". In Proceedings of the International Conference on Very Large Databases (VLDB), 2003. 4 pages.

Schnaitter, et al., "COLT: Continuous On-Line Database Tuning", In Proceedings of the ACM International Conference on Management of Data (SIGMOD), 2006. pp. 793-795, Jun. 27-29, 2006.

Stonebraker, et al., "The Design of Postgres" <<http://delivery.acm.org/10.1145/20000/16888/p340-stonebraker.pdf?key1=16888&key2=4199704611&coll=GUIDE&dl=ACM&CFID=11111111&CFTOKEN=2222222>> Last accessed Nov. 21, 2006. pp. 340-355, 1986.

TPC Benchmark H (Decision Support) Standard Specification Revison 2.5.0. Available at <<http://www.tpc.org>> Last accessed Nov. 5, 2006. 148 pages, 1993-2006.

Valentin, et al., "DB2 Advisor: An optimizer Smart Enough to Recommend Its Own Indexes". In Proceedings of the International Conference on Data Engineering (ICDE), 2000. 10 pages.

Warshaw, et al., "VenusIDS: An Active Database Component for Intrusion Detection" <<http://www.cs.utexas.edu/users/miranker/papers/1999/venusids00.pdf>> Last accessed Nov. 21, 2006. 12 pages, Jun. 11, 1999.

Zilio, et a;., "Recommending materialized Views and Indexes with the IBM DB2 DEsign Advisor",. In International Conference on Automatic Computing, 2004. 9 pages.

Non-Final Office Action for U.S. Appl. No. 11/669,807, mailed on Sep. 29, 2011, Nicolas Bruno, "Continuous Physical Design Tuning", 12 pages.

Chaudhuri, et al., "AutoAdmin "What-if" Index Analysis Utility", In Proceedings of the Jun. 1998 ACM International Conference on Management of Data (SIGMOD), 12 pages.

* cited by examiner

BuildAndOrTree ($\mathcal{T}$:Execution Plan) =
    IF ($\mathcal{T}$.isLeaf) // Case1
        RETURN $\mathcal{T}$.request
    ELSE IF ($\mathcal{T}$.request is null) //Case 2
        RETURN AND ( BuildAndOrTree($\mathcal{T}$.child$_1$),
            ...,
            BuildAndOrTree($\mathcal{T}$.child$_n$) )
    ELSE IF ($\mathcal{T}$.isJoin) // Case 3
        RETURN AND ( BuildAndOrTree ($\mathcal{T}$.leftChild),
            OR ( $\mathcal{T}$.request,
                BuildAndOrTree ($\mathcal{T}$.rightChild)))
    ELSE // Case 4
        RETURN OR ( $\mathcal{T}$.request,
            BuildAndOrTree ($\mathcal{T}$.child))

FIG. 6

Alerter (*T*:AND/OR request tree, $B_{min}$, $B_{max}$:storage constraints,

P:minimum percentage improvement)

1     $\mathcal{R} = \emptyset$; i=0

2     Obtain locally optimal configuration $C_0$ 3     while (size $(C_i)$>$B_{min}$ and $100\% \cdot \Delta^T_{C_i} / cost_{current} > P$)

4       if (size$(C_i)$<$B_{max}$)

$\mathfrak{R} = \mathfrak{R} \cup C_i$

5       Pick transformation TR that minimizes penalty $(C_i, TR(C_i))$

6       $C_{i+1} = TR(C_i)$ 7       i=i+1

8     if ($\mathfrak{R} \neq \emptyset$)

Alert ($\mathfrak{R}$)

FIG. 10

LIGHTWEIGHT PHYSICAL DESIGN ALERTER

CROSS-REFERENCE TO RELATED APPLICATIONS

This application is related to U.S. application Ser. No. 11/669,807, filed on Jan. 31, 2007, entitled "CONTINUOUS PHYSICAL DESIGN TUNING," the entirety of which is incorporated herein by reference.

BACKGROUND

Electronic storage mechanisms have enabled accumulation of massive amounts of data. For instance, data that previously required volumes of books for recordation can now be stored electronically without expense of printing paper and with a fraction of physical space needed for storage of paper. Many users employ database systems for storage and organization of data and query such databases to retrieve desirable data. Database systems have been widely deployed and applications associated therewith have become increasingly complex and varied.

Complex queries are common in decision support and reporting scenarios. Query optimization tends to be expensive for such complex queries despite development of techniques to cope with such queries. In addition, physical design tuning of databases has become more relevant. Thus, database administrators spend a considerable time either tuning a less than optimal installation for performance or maintaining a well-tuned installation over time.

Automated tools can tune the physical design of a database and recommend various physical structures, such as indexes and materialized views. However, these automated tools are resource intensive and it is common for tuning sessions to run for a long time before returning a useful recommendation.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description presented later.

In accordance with one or more embodiments and corresponding disclosure thereof, various aspects are described in connection with a physical design alerter that facilitates determining when a physical design tool (which can be resource intensive) should be invoked. According to an embodiment is an alerter that analyzes a workload and determines whether a comprehensive tuning session would result in a configuration that is better than the current configuration.

In accordance with various embodiments, the alerter can work with information gathered during original optimization of a workload. As such, the alerter might not rely on information obtained from additional optimizer calls. The alerter can report whether a certain improvement is possible in order to mitigate false positives that might be unacceptable, and which can contradict the purposes of an alerting mechanism. The alerter can produce different levels of tightness on upper bounds for improvement. Such upper bounds can mitigate false negatives by bounding an improved possible outcome of a comprehensive tuning tool.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIG. 6 illustrates an exemplary algorithm for generating an AND/OR request tree.

FIG. 10 illustrates an exemplary algorithm that can be utilized with the disclosed embodiments.

DETAILED DESCRIPTION

Figure 1:
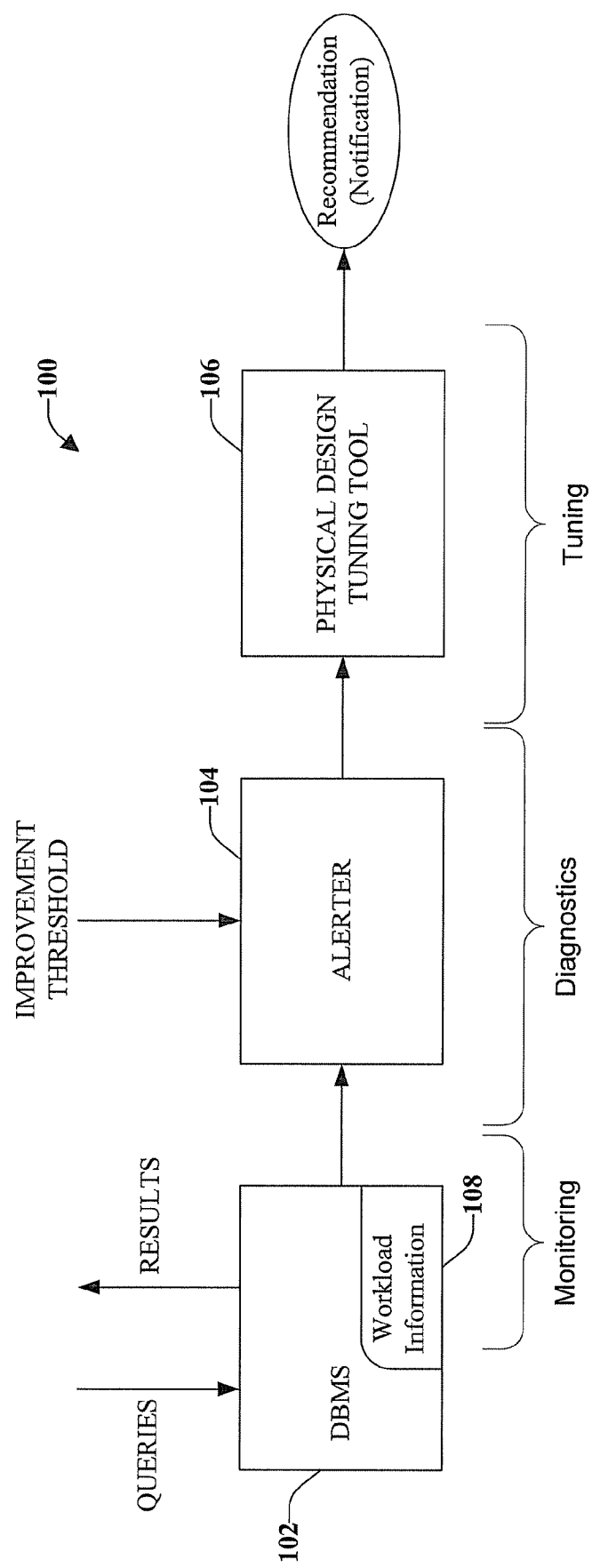
FIG. 1 illustrates a high-level block diagram of a system that can be configured to implement a Monitor-Diagnose-Tune cycle.

Various embodiments are now described with reference to the drawings. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart-cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, illustrated is a system 100 that can be configured to implement a Monitor-Diagnose-Tune cycle. System 100 can facilitate determining whether a current configuration is less than optimal before running an expensive and resource intensive tuning tool. System 100 can provide a lightweight mechanism that provides upper and lower bounds on an improvement that could be expected by invoking the comprehensive physical design tool.

Included in system 100 is a database management system (DBMS) 102 that implements a monitoring portion of a monitor-diagnose-tune cycle. Information from the DBMS 102 is provided to an alerter 104, which implements the diagnostics portion of the cycle. Depending on the recommendation provided by the alerter 104, a physical design tuning tool 106 can be invoked for the tuning portion of the cycle, in accordance with the one or more disclosed embodiments.

In further detail, DBMS 102 can include one or more databases that include one or more columns and rows that can be employed to index content of the database. For example, the database can include information relating to employees in a factory, and columns/rows therein can include employee names, date of hire, hourly wages, hours, worked per week, title, and so forth. An accounting department might be interested in compiling information for payroll purposes while a human resource department might be interested in compiling information relating to promotions, vacations, and so forth. Therefore, each department might compile a query and save such query, which can be utilized each time the information is desired, without requiring recompilation of the query. However, there might be situations when a query might be rendered less than optimal, such as when there are one or more changes to workloads and/or data distributions or when various data (e.g., one or more columns) is removed from the database. In these situations, it might be desirable to run a physical designing tool 106 to tune portions of the database cycle.

DBMS 102 can receive one or more requests for a query or for multiple queries from one or more users and/or entities (e.g., the Internet, another system, a computer, . . . ), hereinafter referred to as user. At substantially the same time as queries are optimized and executed (and results returned to the user), the DBMS 102 can internally maintain information about the workload 108. In some embodiments, the workload information 108 can be maintained external to the DBMS 102. For example, the workload information 108 can be maintained in a memory and/or some other medium that can store information in a retrievable format. By way of example and not limitation, memory can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of example and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

At a substantially similar time as a triggering condition occurs, the alerter 104 can be launched automatically to quickly diagnose the situation that caused the triggering condition. The triggering condition or mechanism can be a fixed or variable amount of time, an established number of recompilations, significant database updates, other situations, or combinations thereof. Such triggering events occur frequently enough so that it would be prohibitive to run a comprehensive tuning tool after each triggering condition.

Alerter 104 can perform light-weight: diagnostics and can utilize as an input an improvement threshold that can provide lower and upper bounds on the improvement that can be expected by invoking the comprehensive physical design tuning tool 106. If the alerter 104 determines that running the physical design tuning tool 106 would result in an improvement beyond a certain pre-specified threshold, a notification or recommendation can be provided to the user (e.g., database administrator) and/or alerter 104 can automatically trigger or invoke the tuning tool 106. The notification can include lower and upper bounds for the improvement that would result from a comprehensive tuning session. Also included in the notification can be a valid configuration that can serve as proof of the lower bounds. Thus, alerter 104 can help determine whether a subsequent physical tuning session is appropriate or is not appropriate. Such a determination can be based on a predetermined improved threshold value or based on other criteria.

Figure 2:
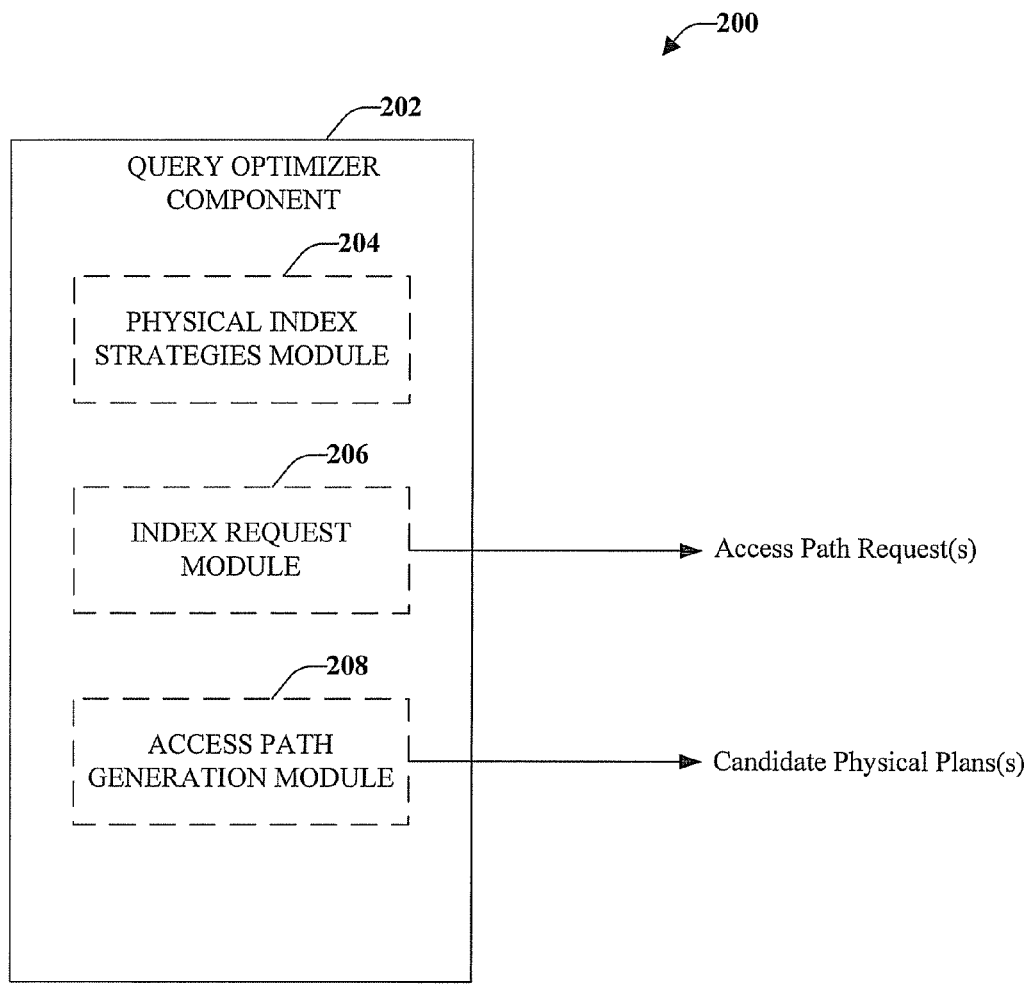
FIG. 2 illustrates a block diagram of a diagnostic mechanism in accordance with the disclosed embodiments.

FIG. 2 illustrates a block diagram of a diagnostic mechanism 200 in accordance with the disclosed embodiments. The diagnostic mechanism 200 can facilitate determining whether a resource intensive physical design tuning tool should be invoked, such as when the tuning session would result in a configuration that is improved over a current configuration.

Since issuing optimizer calls when the alerter is launched would result in excessive overhead (time and money) that would be imposed at run time, the diagnostic mechanism 200 instruments a query optimizer so that the query optimizer gathers additional information during normal optimization of queries. Such information can be maintained in a memory and accessed programmatically and/or periodically persisted in a workload repository. At substantially the same time as the alerter is launched, the pre-computed information can be utilized without calling the optimizer, saving time. As such, a multitude of workload models (e.g., moving window, subset of the most expensive queries, and so forth) can be fed to the alerter without changes.

The mechanism 200 includes a query optimizer component 202 that can be configured to choose access paths to implement logical sub-queries in accordance with the various embodiments presented herein. The query optimizer component 202 can have a unique entry point for access path selection, such as optimizer based on System R or Cascades framework, for example.

Included in query optimizer component 202 is a physical index strategies module 204 that can be configured for finding physical index strategies; which can include index scans, rid intersections and lockups, for example, for logical sub-plans. An index-request module 206 can be configured to issue one or more access path requests (hereinafter referred to as index requests, or simply requests) for different sub-queries. For each request, an access path generation module 208 can be configured to identify among various columns. Such columns can include the columns that occur in sargable predicates, the columns that are part of a sort requirement, and the columns that are additionally referenced in complex predicates or upwards in the query tree. The access path generation module 208 can further be configured to analyze the available index and return one or more candidate physical plans for the input sub-query.

Figure 3:
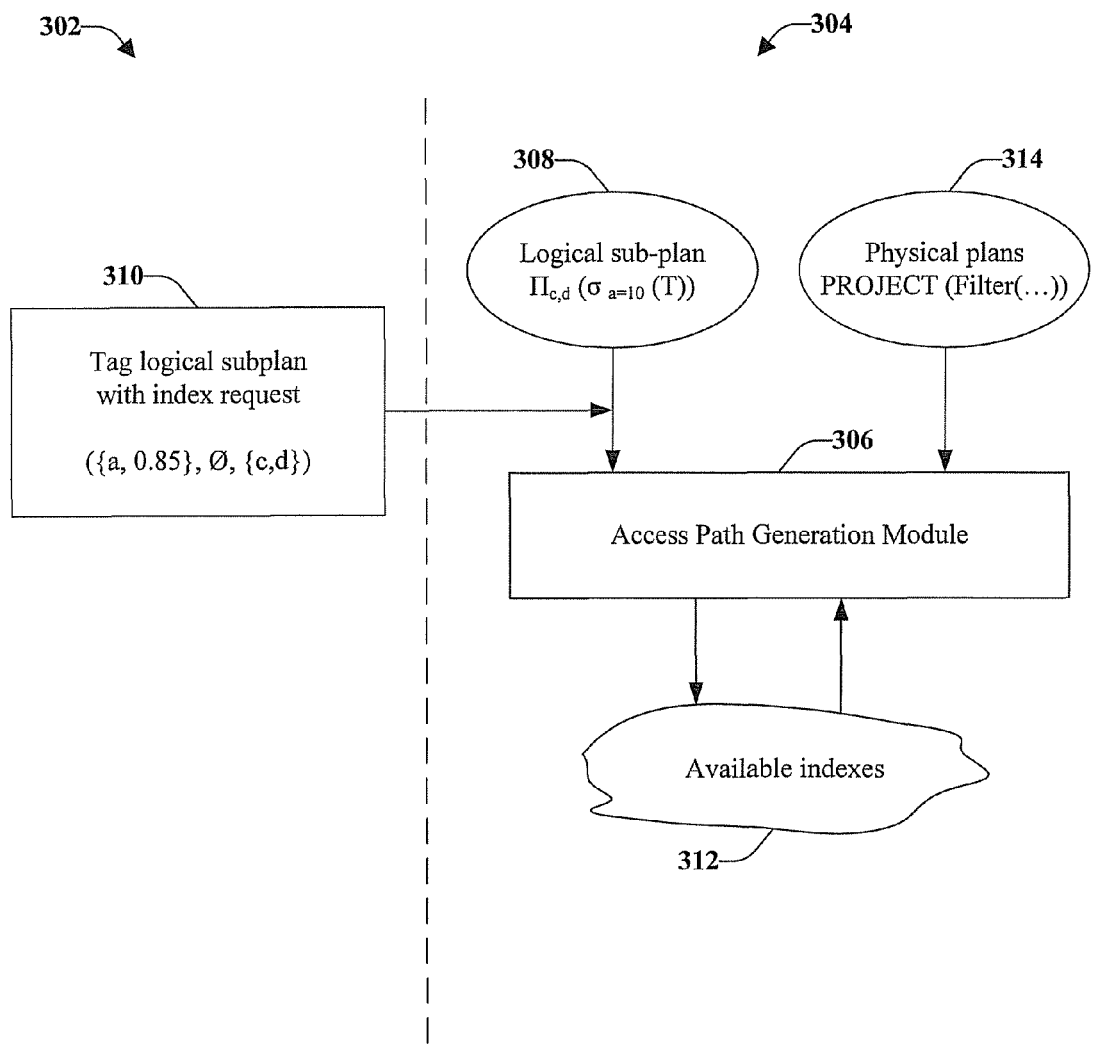
FIG. 3 illustrates exemplary access path selection and request tagging.

FIG. 3 illustrates exemplary access path selection and request tagging. Illustrated on the left is the function performed by the instrumentation 302 and illustrated on the right are the functions performed by the optimizer 304. An access path generation module 306 is associated with the optimizer 304. In this example, τ specifies an order by clause and an index request for a query fragment is illustrated below:

$$\tau_b(\pi_c(\sigma_{a=10}(T)))$$

A logical sub-plan can be $\pi_{c,d}(\sigma_{a=10}(T))$, as illustrated at 308. The logical sub-plan 308 is tagged with an index result 310, such as ({a, 085}, Ø, {c,d}). In this example, the optimizer 304 identifies column a in a sargable predicate, column b as a required order, and column c as an additional column that is either output or referenced upwards in the tree. The information identified (e.g., different columns) is provided to the optimizer 304 that identifies the indexes 312 that might be utilized to implement an efficient sub-plan for the sub query.

In further reference to the above example, an index on column T.a is available. The optimizer 304 than generates a plan that uses an index seek on the index to retrieve the tuples satisfying T.a=10. The optimizer 304 further fetches columns T.b and T.c from a primary index and sorts the resulting tuples by T.b. Depending on the cardinality of T.a=10, an index on columns (T.b, T.a, T.c) might be an improvement. Scanning this index (in b order) and filtering on the fly the tuples that satisfy T.a=10 might be more efficient if it mitigates sorting an intermediate result. A cost based optimizer 304 in accordance with the disclosed embodiments, considers the alternative plans described above and returns the physical access plan that is determined to be the most efficient with respect to the available indexes.

In some embodiments this, approach can be utilized to generate index nested-loops plans, which can implement joins between an arbitrary outer relation and a single-table inner relation that is repeatedly accessed using an index to obtain join matches. In such embodiments, the access path generation module 306 can be configured to utilize the inner table only, and the joined column in the table is considered a part of a sargable (equality) predicate. For example, the logical sub-plan is $(Q \bowtie_{Q.x=T.y} T)$, where Q represents an arbitrary complex expression that returns the outer relation in the index-nested loop join. The optimizer 304 passes to the access path selection module 306 the single-table expression $\sigma_{T.y=?}(T)$, and proceeds considering T.y a column in a sargable predicate with an (unspecified) constant value.

Figure 4:
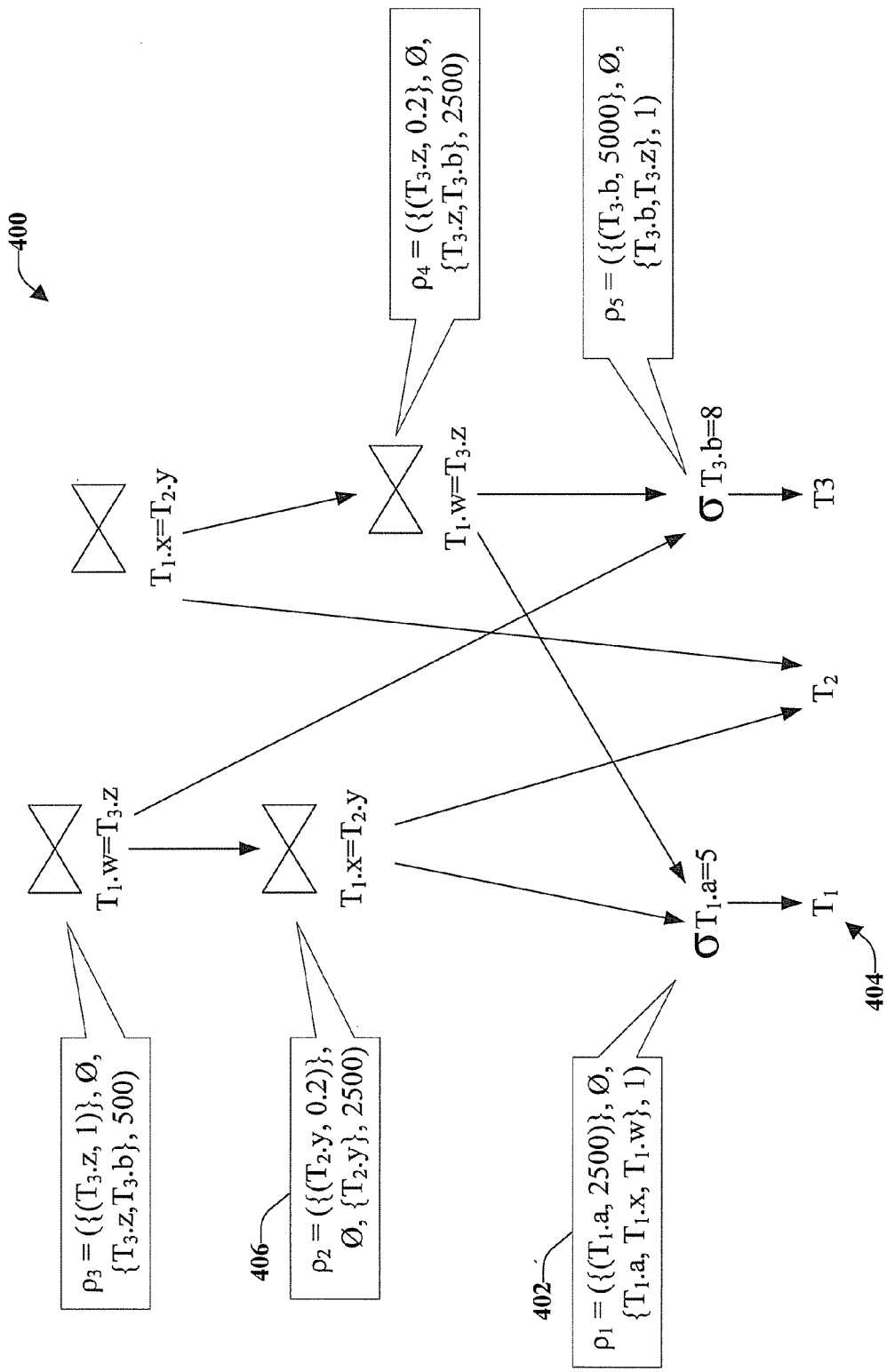
FIG. 4 illustrates an exemplary procedure for a three-way join query.

With reference now to FIG. 4, illustrated is an exemplary procedure 400 for a three-way join query. During plan generation, each time the optimizer issues an index request, information that is relevant to such request is obtained and stored, such as at the root of the originating logical plan. Specifically, for each index request, the tuple (S, O, A, N) is stored. S is the set of columns in sargable predicates and the predicate cardinalities. O is the sequence of columns for which an order has been requested. 4 is the set of additional columns used upwards in the execution plan. N is the number of times the sub-plan would be executed and may be greater than one if the sub-plan is the inner portion of an index-nested-loop plan. In some embodiments, a request table, final cardinality of the request and the type of sargable predicate for each element in S can be stored.

Each request can encode the properties of an index strategy that might implement the sub-tree rooted at the corresponding logical operator (or its right sub-tree in the case of requests originating from joins). This can allow for inferences regarding changes in the physical design without issuing additional optimization calls.

A similar procedure for a three-way join query is illustrated with reference to FIG. 4. A fragment of the search space that the optimizer considers for the query is illustrated. It should be noted that only logical alternatives are illustrated. In addition to some of the logical operators, illustrated are the index requests that were generated. For example, request $\rho_1$ 402 is attached to the selection condition on table $T_1$ 404. Analyzing the tuple (S, O, A, N) for $\rho_1$ 402:

$$(\{T_1.a, 2500\}, \emptyset, \{T_1.a, T_1.w\}, 1)$$

shows that there is one sargable column ($T_1$.a) returning 2500 tuples. There is no order requested ("Ø"), the columns that are required are $T_1$.a, $T_1$.w and $T_1$.x, and the sub-plan would be executed once at runtime.

Similarly, request $\rho_2$ 406 was intercepted when the optimizer attempted to generate an index-nested-loop alternative with $T_1$ and $T_2$ as the outer and inner relations, respectively. Request $\rho_2$ 406 specifies that $T_2$.y is a sargable column which would be sought with 2500 bindings and produce 500 rows overall. Therefore, the average number of tuples matched and returned from $T_2$ is 0.2 per binding (note the 0.2 cardinality value for $\rho_2$ 406). There is no request for the logical join at the top right node because an index-nested loop join needs the inner table (the right operand in the figure) to be a base table.

Figure 5:
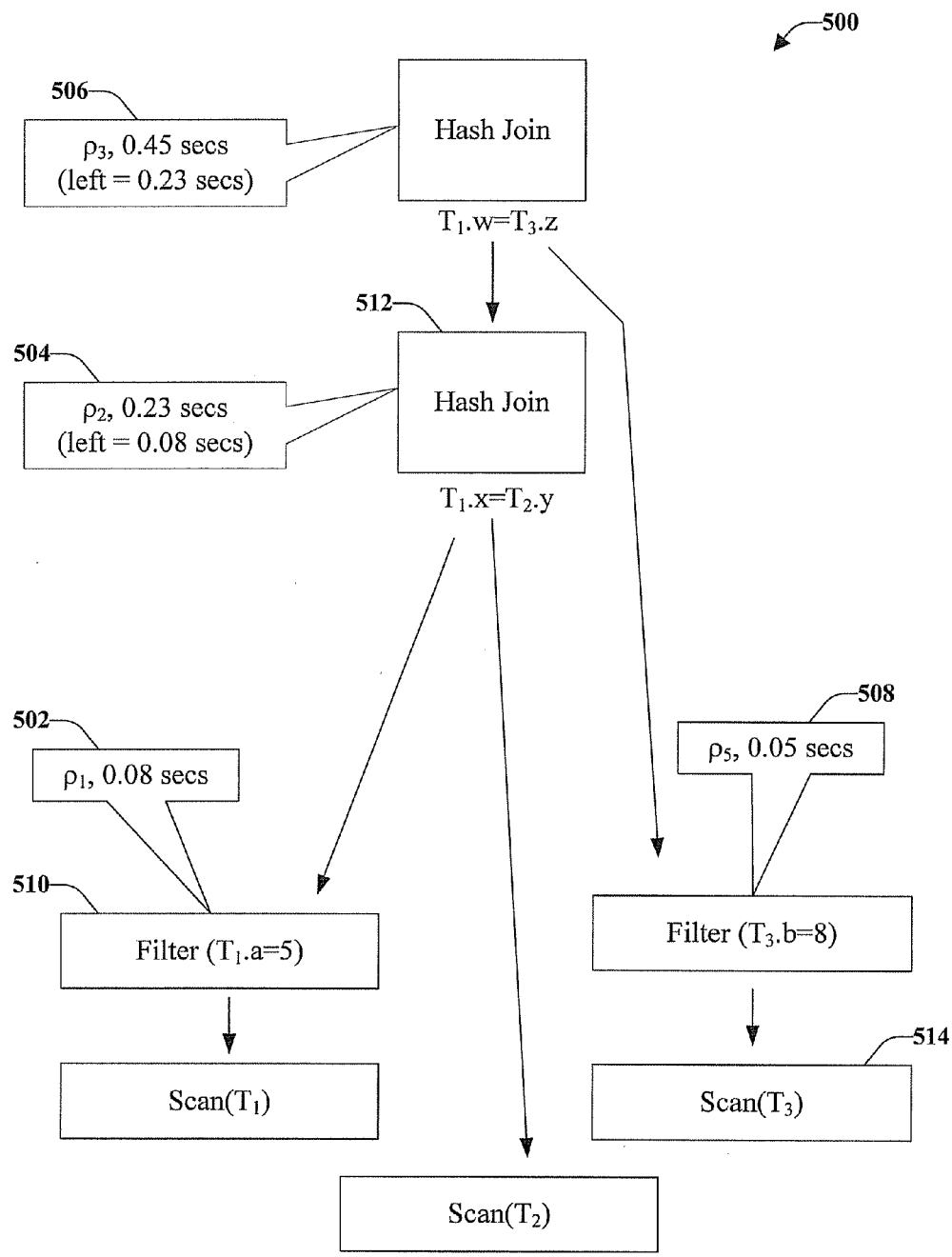
FIG. 5 illustrates an exemplary final execution plan in accordance with the various embodiments presented herein.

FIG. 5 illustrates an exemplary final execution plan 500 in accordance with the various embodiments presented herein. Additional information can be gathered on a subset of the index requests (as discussed with reference to the above figure) that can later be utilized to obtain improvement bounds.

Specifically, after plan generation the resulting execution plan can be evaluated and each physical operator p can be associated with an index request (if any) that corresponds to the logical sub-tree that was implemented by p. Such requests can be referred to as "winning" requests since they are associated with the operators in the optimal plan found by the optimizer. This step is illustrated in FIG. 5, where the "winning" requests are $\{\rho_1, \rho_2, \rho_3, \rho_5\}$, illustrated at 502, 504, 506 and 508, respectively.

For example, $\rho_1$ 502 is associated with the filter operator 510 over table $T_1$ because $\rho_1$ 502 was attached to the logical sub-tree $v_{T1.a=5}(T_1)$. It should be noted that a request $\rho_i$ is not necessarily associated with the physical operator implemented from $\rho_i$. For example, $\rho_2$ 504 is associated with the hash join operator 512 even though originally $\rho_2$ 504 was generated in the context of an index-nested-loop alternative. At this stage, optimization is finished, thus, the "winning" requests are augmented with the cost of the execution sub-plan rooted at the corresponding physical operator. If the request is associated with a join operator, such as $\rho_2$ 504, the cost of its left sub-plan can be stored. In these situations, the left sub-plan can be similar to the hash-join and index-nested-loop alternative plans. Thus, the "remaining" cost of the entire sub-plan can be implicitly stored without counting the common left sub-plan.

In some embodiments, the "winning" requests might conflict with each other. For example, requests $\rho_3$ 506 and $\rho_5$ 508 are mutually exclusive. In other words, if a plan implements $\rho_3$ 506 (e.g., it contains an index-nested-loop join with $T_3$ as the inner table) it cannot simultaneously implement $\rho_5$ 508.

As another example, request $\rho_5$ 508 would conflict with a request $\rho_6=(\emptyset, \emptyset, \{T_3.b, T_3.z\},1)$ (not illustrated) rooted at the Scan($T_3$) operator 514. This is because an execution plan uses one access path for each table in the query. Therefore, either $\rho_6$ can be implemented (e.g., by scanning some index on $T_3$ and filtering $T_3.b=8$ on the fly) or $\rho_5$ can be implemented (e.g., by directly seeking the valid tuples in $T_3$), but both $\rho_6$ and $\rho_5$ cannot be implemented.

To explicitly represent these relationships, the "winning" requests can be encoded in an AND/OR tree, where internal nodes indicate whether the respective sub-trees can be satisfied simultaneously (AND) or are mutually exclusive (OR). It should be noted that AND/OR trees as utilized herein are based on a common interpretation in the context of memo structures and query optimization, not necessarily in the strict logical sense. The AND/OR tree can be built by traversing the execution plan in post-order. FIG. 6 illustrates an exemplary algorithm 600 for generating an AND/OR request tree.

The algorithm 600 illustrates a recursive functional specification of a procedure of an input execution plan T. If T is a single node, a simple AND/OR tree is returned with the request (if any) of such node, as illustrated at Case 1 (602). Otherwise, if T's root node has no requests, the trees generated are AND together for each of T's execution sub-plans, since these are orthogonal, as illustrated at Case 2 (604). Otherwise, if the root of T has a request, the answer depends of the type of node. If it is a join, its request $\rho$ corresponds to an attempted index-nested-loop alternative. As discussed with reference to the above figure (e.g., with respect to $\rho_3$ 506 and $\rho_5$ 508) $\rho$ and the requests on T's right sub-plan are mutually exclusive. However, these requests are orthogonal to the requests in T's left sub-plan, and thus the AND/OR tree of Case 3 (606) is returned. If the root T is not a join node, the request $\rho$ conflicts with any request in the sub-plan of T (since both alternatives cannot be implemented) and therefore, the AND/OR tree of Case 4 (608) is returned.

Figure 7:
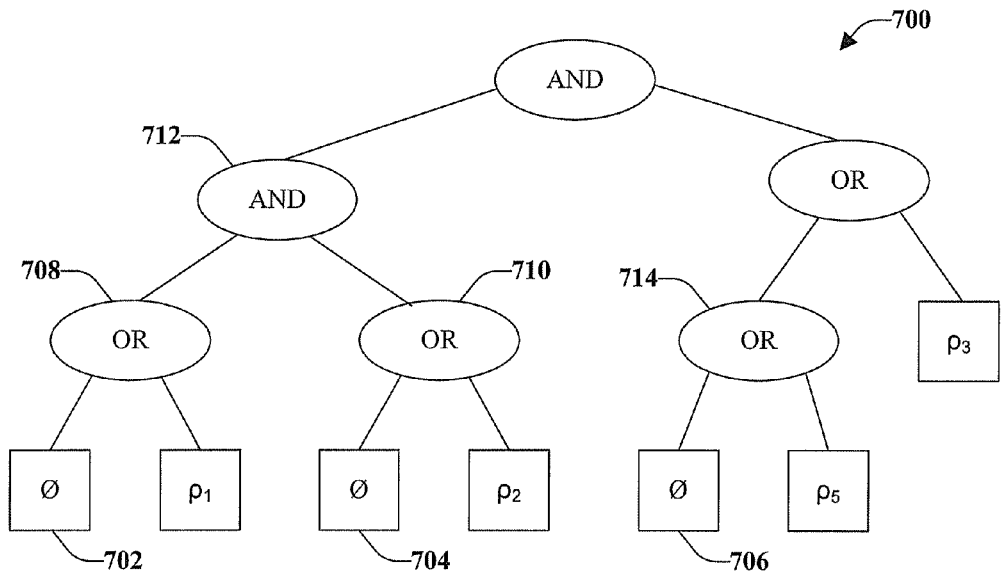
FIG. 7 illustrates an exemplary original AND/OR request tree in accordance with the disclosed embodiments.

FIG. 7 illustrates an exemplary original AND/OR request tree 700 in accordance with the disclosed embodiments. This figure illustrates the resulting AND/OR tree 700 for the "winning" requests of the final execution plan 500 of FIG. 5. This AND/OR tree should be normalized so that it contains no empty requests 702, 704, and 706, or unary intermediate nodes 708, 710, 712, and 714, and strictly interleaves AND and OR nodes, such as by introducing n-ary internal nodes, for example.

Figure 8:
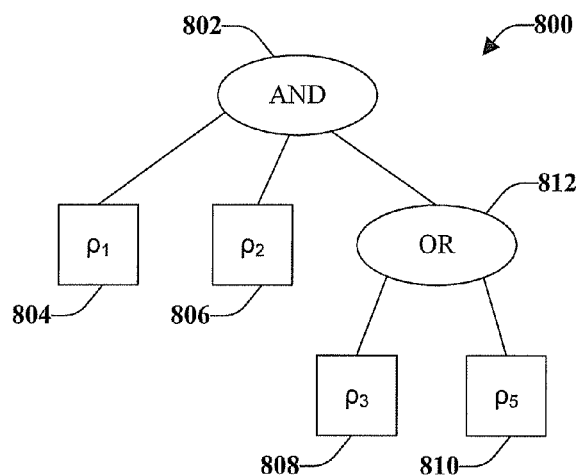
FIG. 8 illustrates an exemplary normalized AND/OR request tree in accordance with the embodiments presented herein.

FIG. 8 illustrates an exemplary normalized AND/OR request tree 800 in accordance with the embodiments presented herein. This is the normalized AND/OR tree 800 from the tree 700 illustrated in the above figure. The normalized tree 800 includes an AND root node 802 whose children are either base requests 804, 806, 808 and 810 or simple OR node(s) 812. In other words, due to the specific nature of execution plans and requests, this can be summed up as: The normalized AND/OR request tree for an input query can be either (i) a single request, (ii) a simple OR root whose children are requests, or (iii) an AND root whose children are either requests or simple OR nodes (Property 1).

By structural induction on the specification of BuildAndOrTree and referring back to FIG. 6. For a single-node execution sub-plan (e.g., Case 1, 602), BuildAndOrTree returns a single request (which satisfies Property 1 (i) a single request). If the input sub-plan is a join tree with root T and sub-trees $T_L$ and $T_R$, and T has a request (e.g., Case 3, 606), then it should be the case that $T_R$ is either a base table or a selection on a base table (this can be a condition for the index-nested-loop join alternative that generated the request on T). Therefore, the recursive call for $T_R$ would use Case 1, 602, or Case 4, 608, returning either a single request (i) or a simple OR node (ii) (e.g., no AND nodes) of Property 1. In addition, the recursive call for $T_L$ can satisfy (i), (ii) or (iii) of Property 1. A similar process can be utilized to verify Case 2, 604, and Case 4, 608.

Since requests for different queries can be orthogonal and can be satisfied simultaneously, the AND/OR request trees of a given workload can be combined by using an AND root node. Normalizing this combined tree can obtain, for an arbitrary input workload, an AND/OR request tree that satisfies the above Property 1. This normalized tree can be utilized by the alerter to infer about the workload in the presence of physical design changes while mitigating issuing additional optimization calls.

In some embodiments, both indexes and materialized views can be recommended. Similar to the access path selection module illustrated in FIG. 3, query optimizers can utilize a view matching component that, once invoked with a sub-query, can return zero or more equivalent rewritings of such query using an available view in the system. The optimizer can be instrumented to analyze such requests and tag the root of each sub-query that is passed to the view matching mechanism as in the case of index requests. These view requests can be more complex than index requests since the view expression itself (which might contain joins, grouping clauses and computed columns) is encoded. In this case, at the end of query optimization an AND/OR tree is returned that contains both index and view requests along with the cost of the best available execution sub-plan found by the optimizer (with might or might not use materialized views).

As a simple example, extending FIGS. 4 and 5, an additional view request $\rho v$ with definition $\Pi_{T_1.w}(T_1 \bowtie_{x=y} T_2)$ can be attached to the join node that currently contains $\rho_2$. The cost associated with $\rho v$ would be 0.23 time units, since that is the cost for the best sub-plan found by the optimizer.

When creating the AND/OR tree, the algorithm of FIG. 6 can be extended by ORing each node that contains a view request with the original AND/OR tree that would result if no view requests are present. This is because either the index request in the sub-trees or the view request can be implemented, but not both. In the example, the normalized request tree is AND(OR(AND($\rho_1, \rho_2$), $\rho v$), OR ($\rho_3, \rho_5$)), which is not as simple as in Property 1.

When view matching succeeds, the optimizer rewrites the corresponding sub-query with the view, and issues index requests to obtain physical sub-plans with indexes over materialized views. View requests are inherently less precise than index requests, since there is usually no available information on what index strategies would be requested over the corresponding views if these are not matched during optimization. However, as explained with reference to the lower bounds, valid sub-plans are generated rooted at requests. In these situations, the naive plan can be generated that sequentially scans the primary index of the materialized view and filters all the relevant tuples. This would be a loose bound in general because materialized views can evaluate the same sub-query more efficiently. However, in many situations this can provide reasonable approximations, even for aggregate views that return a few tuples after performing complex computation. In a similar manner, this can be extended to other physical design features (e.g. partitioning).

Figure 9:
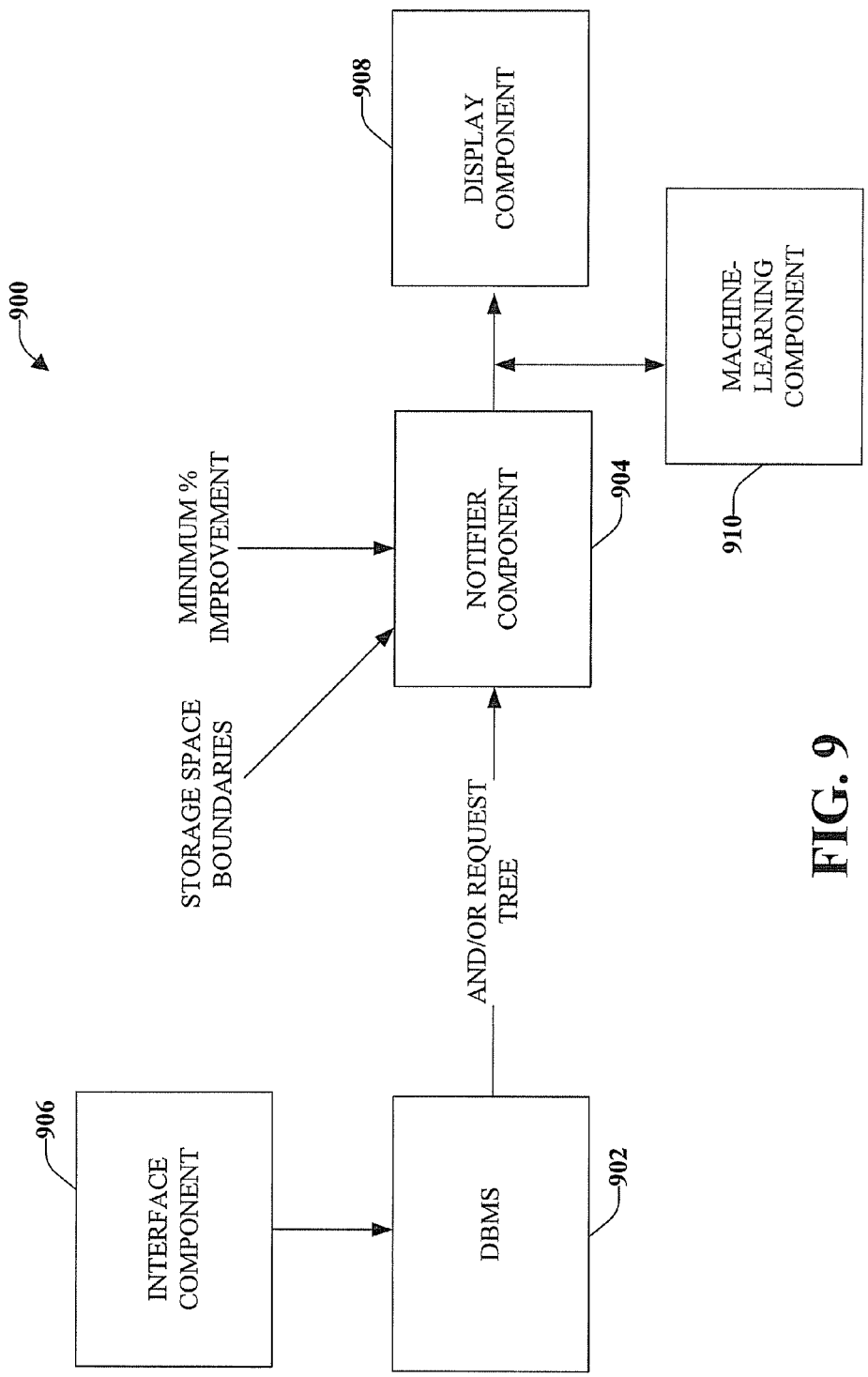
FIG. 9 illustrates an exemplary system for dynamically determining when to run an optimization tool.

FIG. 9 illustrates an exemplary system 900 for dynamically determining when to run an optimization tool. Included in system is a Database Management System (DBMS) 902 that can include various databases that contain data organized by way of tables, wherein the tables include a plurality of columns and rows. It should be understood that other techniques of organizing data can be utilized with the disclosed embodiments, provided such data can be expressed in the form of rows and columns. For example, the database can include information relating to car purchases, and columns therein can include purchaser names, date of purchase, amount of purchase, make of car, model of car, amount financed, and so forth. An accounting department might be interested in compiling information for financing or warranty purposes while a sales department might be interested in compiling information relating to the purchase demographics, and so forth. Therefore, each department might compile a query and save such query as a plan, which can be utilized each time the information is desired, without requiring recompilation of the query. However, there might be situations when a query plan is rendered invalid or non-optimal, such as when there are changes in workloads and/or data distributions or when various data is removed from the database. In these situations, system 900 can be configured to make a determination whether an expensive tuning tool should be called and can further be configured to provide various estimates as to the improvement that might result from calling the tool.

During normal operation, the DBMS 902 gathers relevant information about the execution plans that are processed. This information is consolidated in the form of an AND/OR request tree, as discussed above. When a pre-specified triggering event occurs (e.g., once every hour, a database condition changes, and so forth), a notifier component (e.g., alerter) 904 is launched. The inputs to the notifier component 904 include the AND/OR request trees, storage space bounds $B_{min}$ and $B_{max}$ that are acceptable for a new configuration, and a minimum percentage improvement P that is important enough to be alerted. The notifier component 904 analyzes the information and can provide a recommendation, such as to a database administrator, on whether to run a comprehensive tuning tool. Based on the information, the database administrator can selectively determine whether to run the tool. In some embodiments, depending on the analysis performed by the notifier component 904 the system 900 autonomously invokes the comprehensive tuning tool.

There are at least two considerations that can be taken into account to determine whether a comprehensive tuning tool should be invoked. One consideration is a lower bound for improvement and another consideration is an upper bound for improvement. The lower bound analysis can mitigate false positives by providing an estimate of the smallest amount (percentage) of improvement that can be realized by running the tuning tool. The upper bound analysis can mitigate false negatives by providing an estimate of the largest amount (percentage) of improvement that can be realized by running the tuning tool. The lower bound analysis and upper bond analysis can be utilized separately or in conjunction to determine whether the tuning tool should be invoked (e.g., whether running an expensive tuning tool would be beneficial).

The lower bounds for improvement will now be discussed. The goal of a lower bound can be to efficiently obtain a (relatively tight) lower bound on the workload improvement. The improvement of a configuration can be defined as 100% (1-$cost_{after}/cost_{current}$), where $cost_{current}$ and $cost_{after}$ are the estimated costs of the workload for the original and recommended configurations, respectively. The larger the improvement value, the more attractive the recommended configuration might be. A lower bound of the improvement can be equivalent to an upper bound on $cost_{after}$ (because $cost_{current}$ is a constant value). Without calling the optimizer, an upper bound on the cost of each query in the workload over the permissible physical design configurations should be provided.

The following will detail how notifier component 904 can utilize the AND/OR tree generated when the workload was originally optimized to infer about query execution plans for varying physical designs (while mitigating additional optimizer calls).

As discussed above, each request can encode the needs of an index strategy that might implement the sub-tree rooted at the corresponding operator (or its right sub-tree for the case of join-operators). Additionally, each request can report the cost of the better execution plan found by the optimizer to implement the logical sub-query associated with the request.

For example, $\rho_i=(\{(T_1.a, 2500)\}, \emptyset, \{T_1.a, T_1.x, T_1.w\}, 1)$ and a cost of 0.08 time units (shown at 502, in FIG. 5). This can imply that any index-based X sub-plan rooted at the corresponding Filter operator would need to seek 2500 tuples from table $T_1$ utilizing an equality predicate on column $T_1.a$, and return a projection of these tuples (in any order) on attributes $T_1.a$, $T_1.x$, and $T_1.w$. It can also specify that the better execution plan found by the optimizer using the original configuration is estimated to execute in 0.08 time units. In a similar manner, $\rho_2$ can specify that the corresponding sub-tree should join 2500 tuples on column $T_2.y$ from its left sub-tree with 0.2 tuples (on average) on table $T_2$. The cost of the improved execution plan found by the optimizer for this sub-tree (without the left sub-tree cost) is (0.23-0.08)=0.15 time units.

The above example suggest that if a physical sub-plan p that implements a given request $\rho$ is produced, then p can be locally replaced with the original physical sub-plan associated with $\rho$, and the resulting plan would be valid and substantially the same as the original plan. A sub-plan implements $\rho=(S,O,A,N)$ if it returns the columns in A sorted by O and filtered by the predicates over columns in S for as many bindings as N specifies (if applicable). If the cost of the new sub-plan p is calculated, the difference in cost between the original and new index strategies (e.g., how much would the original execution plan improve or degrade if the given sub-tree is replaced with a similar sub-tree), can be obtained.

If the configuration remains fixed, no alternative would result in an improved plan since, by definition, the optimizer returns the most efficient overall execution plan. However, if a new index is created in the database, a prediction on how this index would affect the execution plans of queries in the workload can be made. The queries under the new configuration can be re-optimized and an answer obtained, however, this would be expensive. Instead, notifier component 904 can check whether the newly added index can implement some request ρ more efficiently than what the optimizer originally found. In this way, the overall cost of the corresponding query may be decreased.

Thus, a locally-optimal execution plan should be obtained. In other words, the physical sub-plans associated with each "winning" request in the original plan can be replaced with alternatives that are as efficient as possible. A plan with different join orders or other transformation rules that optimizers apply during plan generation might not be obtained. Thus, some opportunities to obtain a globally optimal execution plan are lost while mitigating expensive optimization calls and providing low overhead. The cost of the plan obtained by local changes can therefore be an upper bound of a global optimal plan that the optimizer would find under the new configuration.

The lower-bound technique can iterate over different configurations, generating alternative execution plans for the input workload by means of local changes. For an explored configuration, an upper bound of the cost of the workload under such configuration can be calculated, which in turn can result in a lower bound on the improvement that could be obtained by a comprehensive tuning tool.

A component of the technique can be the ability to calculate the difference in cost of the workload when a local change is made in a query execution plan by implementing a given request differently from what was originally optimized. For example, a request $\rho=(S,O,A,N)$. If the cost of an alterative sub-plan is to be calculated that uses an index I over columns $(c_1, \ldots, c_k)$ to implement ρ. In this example, $I_{92}$ is the longest prefix $(c_1, \ldots, c_k)$ that appears in S with an equality predicate, optionally followed by $c_{k+1}$ if $c_{k+1}$ appears in S with an inequality predicate. Then, ρ can be implemented by (i) seeking I with the predicates associated with columns in $I_\rho$, (ii) adding a filter operator with the remaining predicates in S that can be answered with all columns in I, (iii) adding a primary index lookup to retrieve the missing columns if $S \cup O \cup A \not\subseteq \{c_1, \ldots, c_n\}$, (iv) adding a second filter operator with the remaining predicates in S, and (v) adding an optional sort operator if O is not satisfied by the index strategy.

The following is an example to illustrate the above, referring to $\rho_1$ 502 in FIG. 5, and $I_1=(T_1.a, T_1.x)$. The execution sub-plan obtained can be an index seek over $I_1$ returning 2500 rows, followed by 2500 primary index lookups to retrieve the missing column $T_1.w$. If instead, the same request is made and index $I_2=(T_1, T_1.w, T_1.a)$, the resulting plan can consist of an index scan over $I_2$ (retrieving all tuples) followed by a filter for column $T_1.a$ that results in 2500 rows.

In some embodiments, for costing purposes, a skeleton plan can be utilized with physical operators and cardinality values at each node. The resulting plan might not be executed. Therefore, the exact predicates associated with the requests are not needed (e.g., $T_1.a=5$ for request pi). The AND/OR request tree therefore can provide the minimal information needed to obtain cost differences. The optimizer's cost model can be used effectively over the skeleton plan to estimate its execution cost (denoted as cost $C_I^\rho$). If an original cost of the sub-plan associated with the request ρ was $C_{orig}^\rho$, then define $\Delta_I^\rho = C_{orig}^\rho - C_I^\rho$. Then $\Delta_I^\rho$ is the local difference in cost if ρ is implemented with an index strategy based on I instead of the one used originally by the optimizer. It should be noted that $\Delta_I^\rho$ might not be positive. For example, a bad choice of I can result in a sub-plan that is more expensive than the one originally obtained by the optimizer.

In some embodiments, a configuration can contain multiple indexes defined over the table of a given request. More than one index can be utilized to obtain a physical sub-plan that implements a request (e.g., by using index intersections), however, this can increase the processing time of the notifier component 904. Thus, in accordance with some embodiments, the difference in cost can be calculated by implementing a request ρ with a better index strategy from a configuration C as $\Delta_C^\rho = \min_{I \in C} \Delta_I^\rho$ (if I and ρ are defined over different tables, define $\Delta_I^\rho = \infty$).

In general, the workload can be encoded as an AND/OR request tree and OR nodes can rule out multiple requests that occur at substantially the same time in a query plan. The difference in cost for an AND/OR request tree and a configuration C can be defined inductively as:

$$\Delta_C^T \begin{cases} \Delta_C^{request(T)} & \text{if } T \text{ is a leaf node} \\ \sum_i \Delta_C^{T.child_i} & \text{if } T \text{ is an AND node} \\ \min_i \Delta_C^{T.child_i} & \text{if } T \text{ is an OR node} \end{cases}$$

The value $\Delta_C^T$ can be the difference in the workload execution cost between C and the original configuration. The $\Delta_C^T$ values are lower bounds on such difference, since feasible plans that the optimizer would find for C are obtained.

Next, initializing the search strategy will the discussed. The alerter can search a space of configurations for one (or some) that fit in an available space and is as efficient as possible. Thus, a relaxation-based approached can be performed that begins with a better locally optimal configuration and progressively relaxes it into smaller and less efficient configurations. The initial configuration can be obtained as the union of the indexes that implement the better strategy for each request in the AND/OR request tree.

For example, a request $\rho=(S,O,A,N)$ where each element in S contains a column, a predicate type (e.g., equality or inequality), and the cardinality of the predicate. The index that leads to the most efficient implementation of ρ (e.g., the better index for ρ) can be obtained by first obtaining the better "seek-index" $I_{seek}$. The seek-index $I_{seek}$ can include (i) all columns in S with equality predicates, (ii) the remaining columns in S in descending cardinality order, and (iii) the columns in $(O \cup A)-S$. It should be noted that if DBMS supports suffix columns, only columns in (i) and the first column in (ii) are key columns and the remaining are suffix columns. Next, the better "sort-index" $I_{sort}$ can be obtained. The sort-index $I_{sort}$ can include (i) all columns in S with single equality predicates (which would not change the overall sort order), (ii) the columns in O, and (iii) the remaining columns in $S \cup A$. Lastly, the method returns $\min \arg_{I \in \{I_{seek}, I_{sort}\}} \Delta_I^\tau$.

As another example, refer to request $\rho_3$ in FIGS. 4 and 5. This request has no sort columns, so the better overall index in this case can be the "seek-index" $(T_3.z, T_3.b)$ obtained as described above. This procedure can be repeated for each index request and the resulting indexes combined into the initial configuration $Co=\{(T_1.a, T_1.x, T_1.w), (T_2.y), (T_3.z,$ $T_3.b$), ($T_3.b$, $T_3.z$)}. Each request can be implemented as efficiently as possible, thus it cannot be guaranteed that this configuration results in the most efficient locally optimal execution plans among all possible configurations. This configuration can be very large because each request can be associated with a very specific index. It is likely that many indexes in CO are unique (e.g. they implement optimally a single request) and therefore the size of the locally optimal configuration $C_0$ tends to be large.

Once the initial, locally optimal configuration is obtained, it can be gradually relaxed to obtain alternative configurations that might be better from a cost-benefit point of view. Specifically, each configuration can be transformed into another configuration that is smaller but less efficient. Since the notifier component 904 should be fast, index-deletion and index-merging can be implemented in some embodiments. Index-deletion and index-merging can be utilized as the only transformations and a greedy search can be performed in which movement from one configuration to the next configuration occurs using the locally most promising transformation.

The concept of index-merging can mitigate redundancy in a configuration while mitigating losing efficiency during query processing. The (ordered) merging of two indexes $I_1$ and $I_2$ can be defined as the better index that can answer all requests that either $I_1$ or $I_2$ can efficiently seek in all cases that $I_1$ can. However, some requests that can be answered by seeking 2 might need to scan the merged index. Specifically the merging of $I_1$ and $I_2$ can be defined as a new index that contains all the columns of $I_1$ followed by those in $I_2$ that are not in $I_1$. For example, merging $I_1$=(a, b, c) and $I_2$=(a, d, c) can result in $I_{1,2}$=(a, b, c, d). Since index merging is an asymmetric operation (e.g., in general merge ($I_1$, $I_2$)≠merge ($I_2$, $I_1$)), therefore, both cases should be considered.

When transforming a configuration C there may be alternatives. Each index in C can be deleted or any pair of indexes defined over the same table can be merged. To rank the transformations, the penalty of transforming a configuration C into C' by an index deletion or index merge can be utilized. Penalty values can measure the increase in execution cost per unit of storage that was saved in C' compared to C. Thus, for an AND/OR request tree $T_1$.

$$\text{penalty}(C, C') = \frac{\Delta_C^T - \Delta_{C'}^T}{\text{size}(C) - \text{size}(C')}$$

With further reference to FIG. 9, in some embodiments, a user can interface with database 902 (and/or a physical design tuner or other system 900 components) through, for example, an interface component 906. For example, the interface component 906 can be, but is not limited to being, a keyboard, a mouse, a pressure sensitive screen, a graphical user interface, a microphone, and voice recognition software. The results of the notifier component 904 can be, presented to the user through a display component 908 such as a graphical user interface.

In some embodiments, a machine learning component 910 can be utilized with the disclosed techniques. The machine-learning component 910 can employ artificial intelligence based systems (e.g., explicitly and/or implicitly trained classifiers) in connection with performing inference and/or probabilistic determinations and/or statistical-based determinations with respect to selection of a whether to perform an alert or whether a tuning tool should be invoked. As used, herein, the term "inference" refers generally to the process of reasoning about or inferring states of the system, environment, and/or user from a set of observations as, captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, and so forth) can be employed in connection with performing automatic and/or inferred action in connection with the disclosed techniques.

With reference now to FIG. 10, illustrated is an exemplary algorithm 1000 that can be utilized with the disclosed embodiments. During normal operation, a DBMS can gather relevant information about the execution plans that are processed. This information can be consolidated into an AND/OR request tree. When a triggering event occurs, an alerter can be launched. The inputs to the alerter include the AND/OR request tree, space bounds $B_{min}$ and $B_{max}$ that are acceptable for a new configuration and the minimum percentage improvement P that is considered important enough to be alerted. Thus, first the locally optimal configuration $C_0$ is obtained in line 2 (also refer to initializing the search strategy discussed above). Then the current configuration is transformed until the resulting size is below the minimum storage constraint or the expected improvement is below the minimum deemed necessary for an alert (lines 3-7). At each step, the transformation TR (index merging or deletion) with the smallest penalty value can be chosen and a new configuration can be created (lines 5-6). After the main loop is exited, in line 8, a check can be made to determine whether some configuration satisfies all the constraints. In such a case, an alert can be issued that contains the list of all configurations (C) that fit in the available space (e.g., $B_{min} \leq \text{size}(C) \leq B_{max}$) and are estimated to have at least P improvement. A database administrator or other entity can analyze the alert and proceed as appropriate.

The above detailed how the alerter obtains a lower bound on the improvement that a comprehensive tuning tool might recommend and can mitigate false positives which would waste resources. However, false negatives can be produced in situations in which the embodiments described above do not alert because the expected improvement is not significant. This can be due to a lower bound that is not sufficiently tight, and therefore a good tuning opportunity might be missed. To mitigate these situations, the alerter can generate upper bounds on the potential improvement. This additional information can help database administrators to refine polices to trigger tuning session (e.g., alert if the minimum improvement is 25% or there is potential for 75% improvement).

As discussed, the optimizer can issue multiple index requests during processing of each query. These requests can be used to generate index strategies that can be weighted and combined in the final execution plan. It is not known what index strategy will be used under the best available configuration but at least on request would be implemented in the final execution plan. In addition to returning "winning" requests (e.g., those requests that are associated with a final execution plan), as described above, a list of the remaining candidate requests during query optimization can be generated. This information grouped by the table over which each request is defined can be returned. Then, for each table in the query, the cost of the better index strategy for each request can be computed using a similar technique to that described above with regard to the lower bound technique. The most efficient alternative for each table can be kept and all the estimated costs can be added together.

With reference again to the example of FIG. 4 that represents only a portion of the search space. The requests grouped by table are $T_1 \rightarrow \{\rho_1\}$, $T_2 \rightarrow \{\rho_2\}$, and $T_3 \rightarrow \{\rho_3, \rho_4, \rho_5\}$. It might not be known whether the execution plan for the better possible configuration implements $\rho_3$ or $\rho_4$ for table $T_3$ (performing a nested-loop-join with $T_1$ or $T_1 \bowtie T_2$, respectively, as the outer relation) or even $\rho_5$ (seeking tuples for which $T_3.b=8$). However, some of these alternatives might be needed. A lower bound on the cost of the query can be calculated as the sum of costs of the sub-plan that implements $\rho_1$, the sub-plan that implements $\rho_2$, and the most efficient alternative among the sub-plans that implement $\rho_3$, $\rho_4$ and $\rho_5$. Thus, a lower bound can be obtained on the cost of any execution plan for the input query, and therefore, an upper bound on any recommended improvement.

This procedure can be efficient since it outputs additional information used during optimization with minimal additional computation. However, it can return a loose upper bound since only the necessary work for the leaf nodes in the execution plans are considered. However, there might not be any cost assigned to intermediate nodes such as joins or aggregates (to maintain a low overhead). Additionally, storage constraints might not be considered, which often restrict the space of feasible configurations and therefore might diminish the better possible improvement.

In accordance with some embodiments, tighter upper bounds can be produced by extending the interception mechanism discussed above. However, additional overhead during optimization might be utilized. The idea of tighter upper bounds is to intercept all index requests (as discussed with reference to FIG. 3), but instead of simply tagging the logical operators with the requests, the following is performed (i) suspend optimization and analyze the request, (ii) calculate the index that result in the most efficient plan for such request, (iii) simulate the index in the system catalogs, and (iv) resume optimization so that the newly simulated index is selected. This procedure can be repeated with each index request to allow the optimizer to obtain the better indexes to implement each logical plan.

This procedure can return the better execution plan for each input query over the space of all possible configurations. In other words, assuming that no storage constraint is given, the tightest possible upper bound for the improvement of each optimization query can be obtained.

In some embodiments, a second optimization of the query is performed using only the existing indexes. In this way, after two optimization calls, both the better hypothetical plan when all possible indexes are present and the better "executable" plan that only uses available indexes can be obtained. Since optimizing each query twice during normal optimization is expensive, some embodiments might interleave the two optimization calls and at substantially the same time obtain both execution plans with less overhead.

In such an embodiment, the optimizer can be modified by adding a new sub-plan property (referred to as feasibility). A sub-plan can be feasible if it does not refer to hypothetical indexes in any of its physical operators. Additionally, the access path generation module can be extended so that after generating all the traditional index strategies, the access path generation module produces a new candidate with the better hypothetical index. This index strategy can be an efficient alternative, so in a normal situation the remaining index strategies can be discarded as being less than optimal. In some embodiments, the feasible property is exploited analogously to interesting orders in a traditional System R optimizer or the notion of required properties in Cascades-based optimizers. The net effect can be that less than optimal, feasible plans are maintained. Thus, at the end of query optimization, both the better feasible and overall plans are obtained, which correspond, respectively, to the better execution plans when no hypothetical indexes are present and when all possible hypothetical indexes are available. The better feasible plan can be the same that would have been obtained by a traditional optimizer. The best overall plan can correspond to the optimal execution plan over all possible configurations and can be utilized to obtain an upper bound on the improvement of a comprehensive tool.

In accordance with some embodiments, some workloads consist of a mixture of both select and update queries. A physical design tool should take into consideration both classes. An impact of an update query is that some (of all) indexes defined over the updated table should also be updated as a side effect.

Each update query can be separated into two components: a pure select query (which is processed as described above) and a small update shell (which is processed separately). For example, for the following query:

UPDATE $T$ SET $a=b+1$, $c=c*2$ WHERE $a<10$ AND $d<20$ can be seen as a pure query:

SELECT $b+1$, $c*2$ FROM $T$ WHERE $a<10$ and $d<20$ and an update shell:

UPDATE TOP($k$) $T$ SET $a=a$, $c=c$ where k is an estimated cardinality of the corresponding select query.

In addition to the AND/OR tree for select queries, information for the update shells are gathered during optimization. For each update query the following is stored (i) the updated table, (ii) the number of added/changed/removed rows, and (iii) the query type (e.g., insert, delete or update). This information is used to calculate the update overhead imposed by a new arbitrary index. By using an optimizer cost model, the cost of any update shell for a given index can be calculated. The difference in cost of an AND/OR request tree for a given configuration C is extended for the case of updates as $$\Delta_C^T + \sum_{I \in C} \sum_{u \in updateshells} updateCost(I, u).$$

For update queries, the following changes are made to the exemplary algorithm 1000. First, the predicate on line 3 is relaxed by removing the condition on the minimum improvement P, because when updates are present, a configuration can be transformed into another that is both smaller and more efficient. This occurs when the indexes that are removed or merged have large update overhead and relatively smaller benefits for query process. Thus, the loop in lines 3-7 are not stopped after the first configuration with an improvement below P because a later configuration might again put the improvement above P.

For a similar reason, some configurations in R might dominate others (e.g., a configuration in R can be both smaller and more efficient than another in R). This does not happen unless updates are present because each transformation decreases both the size of the configuration and its performance. As a post processing step, the dominated configurations can be removed from R so that the alert does not contain redundant information and is easily analyzable.

When updates are present, the upper bounds (discussed above) can be refined by adding the necessary work by any update shell (e.g., the cost of each update shell for all the indexes that are present in any configuration). This makes the upper bound discussed above loose since there might be no configuration that meets the upper bound even without storage constraints.

Methods that may be implemented in accordance with the disclosed subject matter are provided throughout this disclosure. While, for purposes of simplicity of explanation, the methods are shown and described as a series of blocks, it is to be understood and appreciated that the disclosed embodiments are not limited by the number or order of blocks, as some blocks may occur in different orders and/or concurrently with other blocks from what is depicted and described herein. Moreover, not all illustrated blocks may be required to implement the methods described hereinafter. It is to be appreciated that the functionality associated with the blocks may be implemented by software, hardware, a combination thereof or any other suitable means (e.g. device, system, process, component). Additionally, it should be further appreciated that the methods disclosed hereinafter and throughout this specification are capable of being stored on an article of manufacture to facilitate transporting and transferring such methods to various devices. Those skilled in the art will understand and appreciate that a method could alternatively be represented as a series of interrelated states or events, such as in a state diagram.

Figure 11:
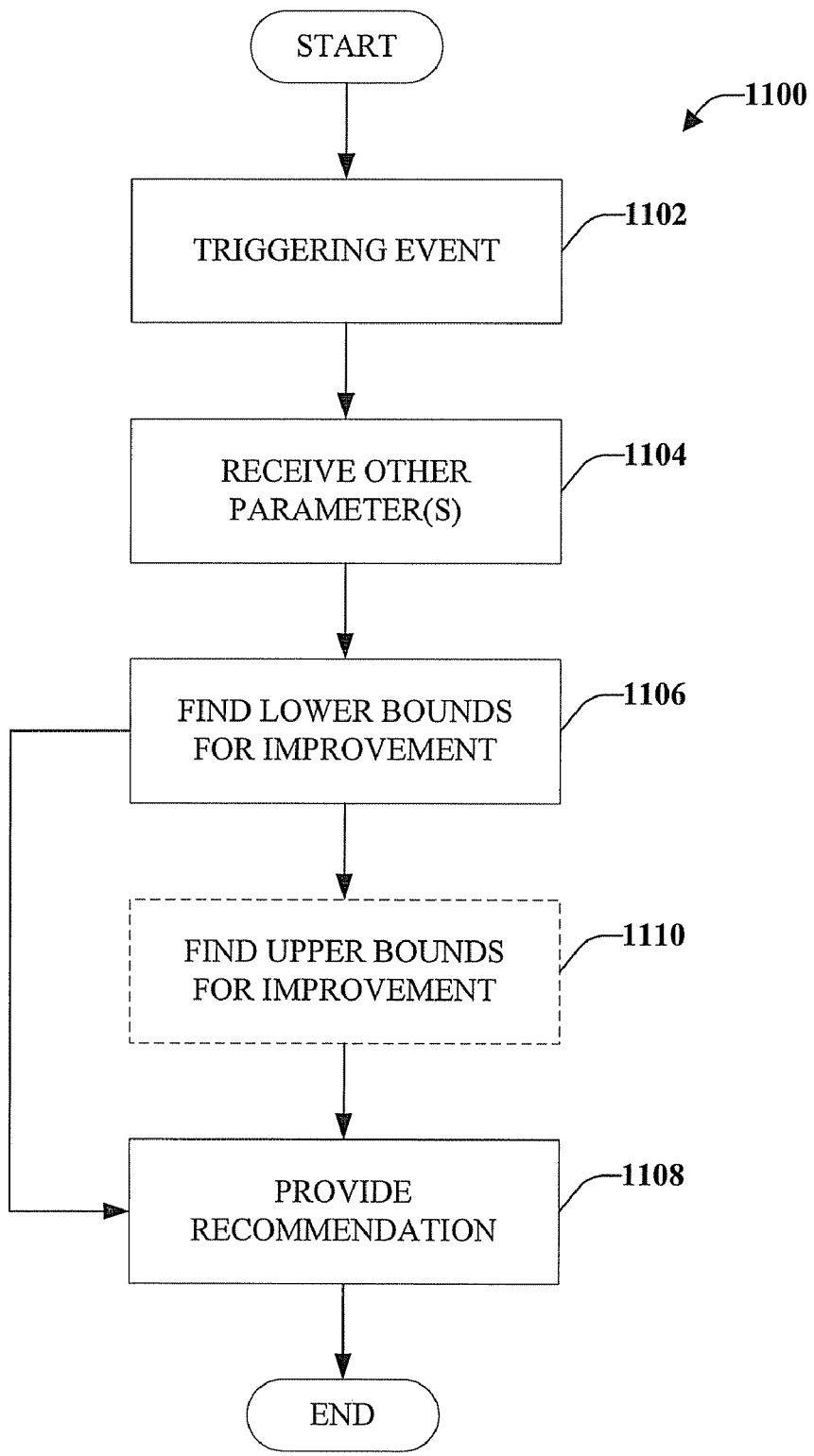
FIG. 11 illustrates a method for utilizing a physical design alerter in accordance with the disclosed embodiments.

FIG. 11 illustrates a method for utilizing a physical design alerter in accordance with the disclosed embodiments. Method 1100 starts, at 1102 when a triggering event occurs. Such triggering events occur frequently enough so that it would be prohibitive (e.g., costly, time consuming) to run a comprehensive tuning tool after each triggering condition. At 1104, various parameters are received. Such parameters includes relevant information about processed execution plans, which can be in the form of an AND/OR request tree. Other parameters can include space bounds (e.g., storage considerations) and the minimum percentage improvement that should be provided.

At 1106, lower bounds for improvement are found such as by obtaining a locally optimal configuration and transforming the current configuration until the resulting size is below the minimum storage consideration or the expected improvement is below the minimum deemed necessary for an alert. If the configuration satisfies all the constraints, an alert can be issued in the form of a recommendation, at 1108.

In some embodiments, upper bounds for improvement are provided, at 1110. Upper bounds can mitigate false negatives that might result in missing tuning opportunities because a lower bound was not sufficiently tight. The upper bounds can help refine policies to trigger tuning sessions.

Figure 12:
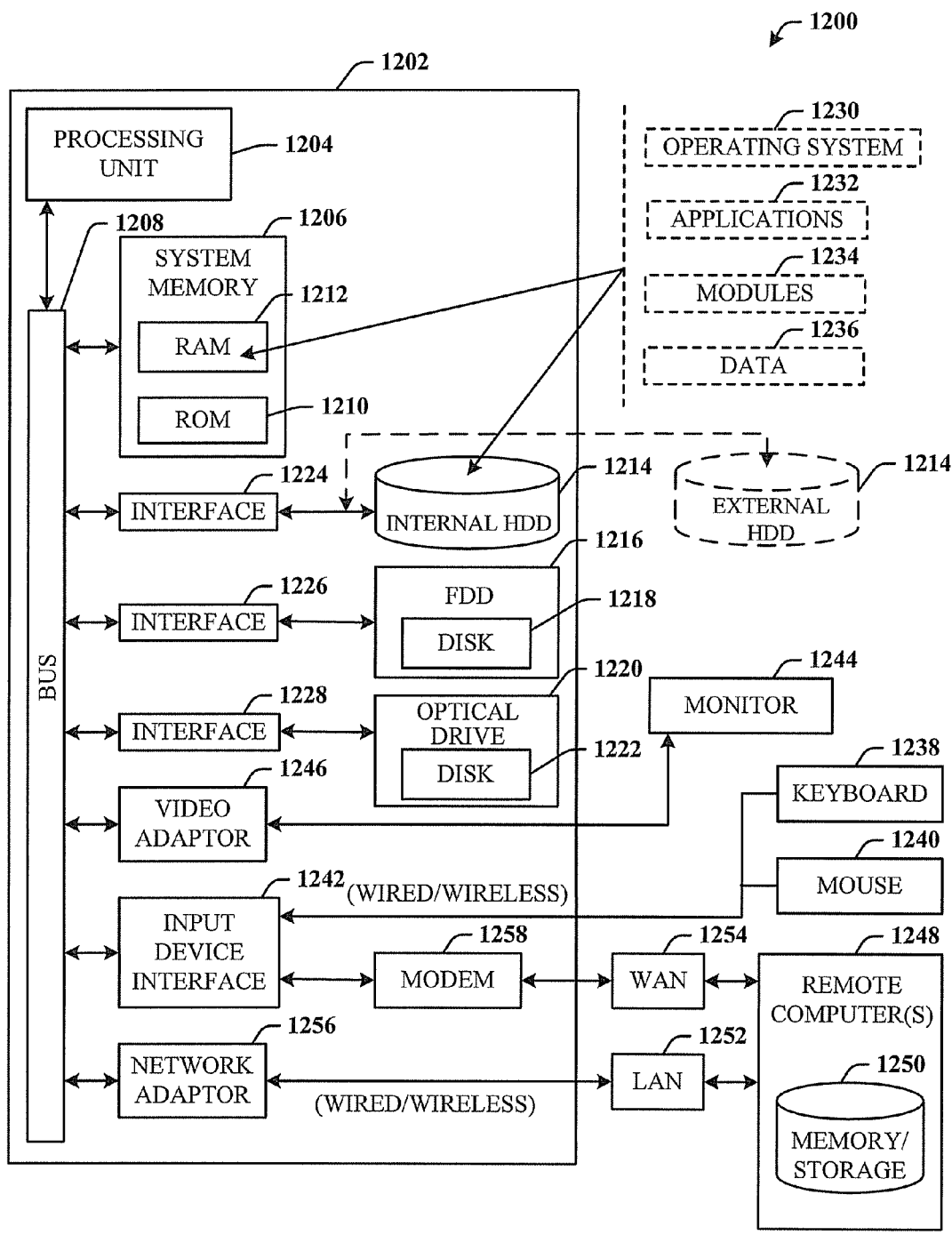
FIG. 12 illustrates a block diagram of a computer operable to execute the: disclosed embodiments.

Referring now to FIG. 12, there is illustrated a block diagram of a computer operable to execute the disclosed architecture. In order to provide additional context for various aspects disclosed herein, FIG. 12 and the following discussion are intended to provide a brief, general description of a suitable computing environment 1200 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the various embodiments can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 through an interface, such as a video adapter 1246. In addition to the monitor 1244, a computer typically includes other peripheral output devices (not shown), such as speakers, printers, etc.

The computer 1202 may operate in a networked environment using logical connections through wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
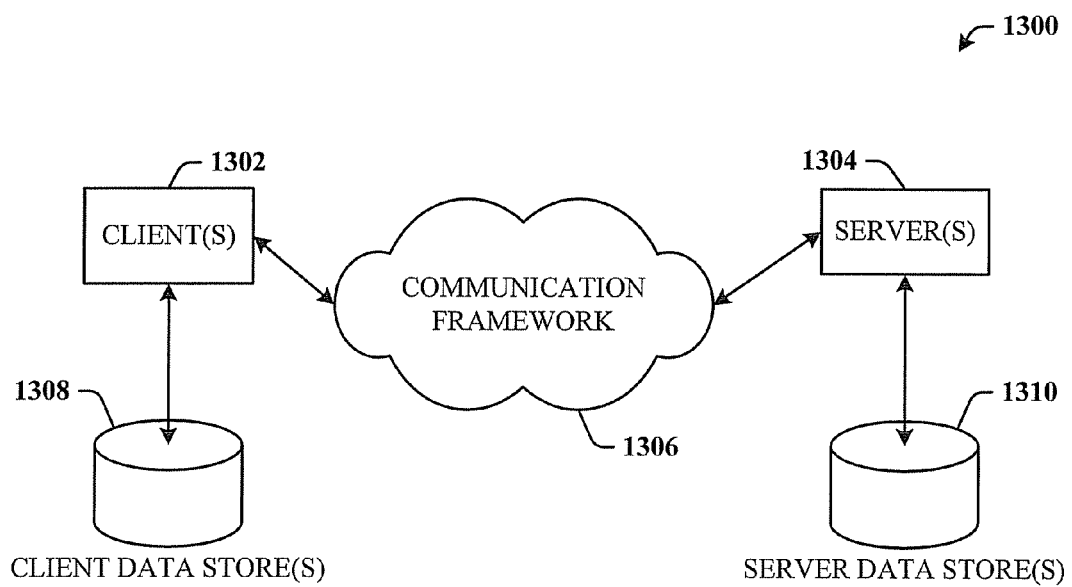
FIG. 13 illustrates a schematic block diagram of an exemplary computing environment operable to execute the disclosed embodiments.

Referring now to FIG. 13, there is illustrated a schematic block diagram of an exemplary computing environment 1300 in accordance with the various embodiments. The system 1300 includes one or more client(s) 1302. The client(s) 1302 can be hardware and/or software (e.g., threads, processes, computing devices). The client(s) 1302 can house cookie(s) and/or associated contextual information by employing the various embodiments, for example.

The system 1300 also includes one or more server(s) 1304. The server(s) 1304 can also be hardware and/or software (e.g., threads, processes, computing devices). The servers 1304 can house threads to perform transformations by employing the various embodiments, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated through a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description or the claims is meant to be a "non-exclusive or".

What is claimed is:

1. A system that facilitates determining when to invoke a physical design tool, comprising:
    memory;
    one or more processors coupled to the memory;
    a database management system, stored in the memory and operable on the one or more processors, that captures workload information of at least one existing configuration;
    a notification component that:
        receives the captured workload information,
        determines, based upon a pre-determined improvement threshold, that a comprehensive tuning session would produce a better configuration than the at least one existing configuration, and
        invokes the physical design tool in response to the determination by the notification component that the comprehensive tuning session would produce the better configuration than the at least one existing configuration,
    the notification component configured to:
        calculate at least a lower bound improvement that mitigates false positives, and
        generate a valid configuration illustrating the calculated lower bound improvement.

2. The system of claim 1, further comprising a display component that presents the determination of the notification component to a user.

3. The system of claim 1, wherein the notification component receives the workload information at substantially the same time as a triggering event occurs.

4. The system of claim 3, wherein the triggering event is at least one of a time interval, a database change, a pre-determined number of recompilations, or a user request, or combinations thereof.

5. The system of claim 1, wherein the notification component is further configured to calculate an upper bound improvement to mitigate false negatives.

6. The system of claim 5, wherein the upper bound improvement is at least one of a fast upper bound or a tight upper bound.

7. The system of claim 1, wherein the database management system consolidates processed execution plan information into a normalized AND/OR request tree.

8. The system of claim 7, wherein the notification component receives the normalized AND/OR request tree, at least one space bound and a minimum percentage improvement.

9. The system of claim 1, further comprising a machine-learning component that selectively determines whether the physical design tool should be invoked.

10. A computer-implemented method for determining whether to invoke a design tool, comprising:
    receiving information associated with at least one existing configuration;
    finding a lower bound for improvement to mitigate false positives;
    determining, based upon a pre-determined improvement threshold, that a better configuration than the at least one existing configuration would be produced; and
    outputting a recommendation to a user that includes the lower bound for improvement and a valid configuration illustrating the lower bound for improvement.

11. The computer-implemented method of claim 10, after finding the lower bound for improvement, further comprising:
    finding an upper bound for improvement, and
    outputting the upper bound for improvement in conjunction with the output lower bound for improvement.

12. The computer-implemented method of claim 11, further comprising determining whether the upper bound for improvement should be a fast upper bound or a tight upper bound.

13. The computer-implemented method of claim 10, wherein the receiving information comprises:
    receiving from a database management system a normalized AND/OR request tree;
    receiving a storage space constraint; and
    receiving a minimum improvement percentage below which a recommendation should not be output.

14. The computer-implemented method of claim 10, further comprising automatically invoking the design tool when predetermined parameters are met.

15. The computer-implemented method of claim 14, wherein the predetermined parameters include at least one of a lower bound percentage or an upper bound percentage.

16. The computer-implemented method of claim 10, further comprising:

finding an upper bound for improvement to mitigate false negatives.

17. A computer executable system comprising:

a memory;

one or more processors coupled to the memory;

a lightweight physical design alerter, stored in the memory and operable on the one or more processors to perform acts comprising:

receiving information associated with workload information gathered while a query is optimized and executed;

calculating at least a lower bound for improvement that can be obtained by running a tuning tool, the at least a lower bound for improvement mitigating false positives; and displaying the at least a lower bound for improvement with a recommendation to run the tuning tool.

18. The computer executable system of claim 17, the acts further comprising:

calculating an upper bound for improvement to mitigate false negatives if the tuning tool is ran.

19. The computer executable system of claim 18, the acts further comprising:

displaying the upper bound for improvement with the at least a lower bound for improvement and the recommendation to run the tool.

20. The computer executable system of claim 17, the acts further comprising:

determining that running the tuning tool should not be recommended based in part on the information associated with the workload information.

* * * * *